United States Patent [19]

Hankins et al.

[11] 4,268,208
[45] May 19, 1981

[54] PORTABLE SELF-ERECTING SILO APPARATUS

[75] Inventors: Ronald G. Hankins; Jimmie J. Butcher, both of Yukon, Okla.

[73] Assignee: CMI Corporation, Oklahoma City, Okla.

[21] Appl. No.: 103,384

[22] Filed: Dec. 13, 1979

[51] Int. Cl.³ .............................................. B65G 65/32
[52] U.S. Cl. ..................................... 414/332; 414/495
[58] Field of Search ............... 414/332, 495, 919, 523; 222/609, 610

[56] References Cited

U.S. PATENT DOCUMENTS

3,142,390 7/1964 Preeman .............................. 414/332
3,586,181 6/1971 Brock ................................... 414/332

Primary Examiner—Robert G. Sheridan
Attorney, Agent, or Firm—Dunlap, Codding & McCarthy

[57] ABSTRACT

A portable, self-erecting silo apparatus utilized for temporarily storing and dispensing asphaltic mix comprising: a chassis suitable for towing behind a vehicle, the chassis having a first end portion and a second end portion; a support frame disposed between the first end portion and the opposed second end portion of the chassis for defining a passageway therebetween for passage therethrough of a vehicle; a container telescopically received in the support frame and movable from a first position wherein the container is disposed within the support frame to a second position wherein the container is disposed generally above the passageway defined by the support frame and the first and second end portions of the chassis; a conveyor; and, pivot means for pivotally connecting the conveyor to one of the first and opposed second end portions of the chassis. The pivot means permits movement of the conveyor between a stored position wherein the container is maintained in the first position and the conveyor is disposed above and supported by the support frame and the container, an intermediate position wherein the container is substantially maintained in the first position and the conveyor is moved to a raised intermediate position, and an operative position wherein the container is moved to the raised second position and the conveyor is raised to an operative position such that an outlet end portion of the conveyor is substantially centrally disposed above the container.

29 Claims, 11 Drawing Figures

PORTABLE SELF-ERECTING SILO APPARATUS

BACKGROUND OF THE INVENTION

1. Field of the Invention

This invention relates generally to portable, self-erecting silo assemblies, and more particularly, but not by way of limitation, to a portable, self-erecting silo apparatus employed to store an asphaltic mix.

2. Description of the Prior Art

In the paving of roadways with an asphaltic mix, it is often desirable to prepare the asphaltic mix at a location close to the site where the asphaltic mix is to be employed so that trucks and other vehicles employed to transport the asphaltic mix do not have to travel long distances. By employing a portable silo the expense to the contractor can be greatly reduced.

In an effort to reduce the travel distance of the asphaltic mix employed at a construction site, numerous types of plant configurations have been heretofore developed which are portable in that they can be dismantled and transported from one location to another so that the plant is located adjacent the construction site. However, the assembly and disassembly of such portable plant configurations require the plant to be shut down for a period of time as well as requiring the use of heavy equipment, such as a crane, trailers, and the like.

To overcome the problems inherent with the portable plant configuration described above, portable, self erecting silo apparatus, such as disclosed in U.S. Pat. No. 3,586,181, have been proposed which are substantially self-contained units. The portable, self-erecting apparatus as disclosed in the before-mentioned patent employs an elongated framework suitable for towing behind a motorized vehicle. While the portable self-erecting silo disclosed in the above mentioned patent has met with success, problems have nevertheless been encountered in the transporting of such silo apparatus due to the length of the apparatus, the design of the apparatus and the like.

Therefore, an object of the present invention is to provide an improved portable, self-erecting silo apparatus for temporary storage and dispensing asphaltic mix which can be readily transported over public roads by a towing vehicle.

Another object of the invention is to provide an improved storage silo for asphaltic mix which can rapidly be converted from a compact traveling condition to an operational condition without the need of expensive heavy equipment.

Another object of the invention is to provide an improved portable, self-erecting silo apparatus which is durable in construction, substantially maintenance free, and which can be easily erected and collapsed from an operational position to a traveling position.

Other objects, features and advantages of the present invention will become apparent to those skilled in the art from a reading of the following detailed description when read in conjunction with the accompanying drawings which illustrate the invention.

BRIEF DESCRIPTION OF THE DRAWINGS

FIG. 8 is an enlarged, partially broken, perspective view depicting the shield assembly operably disposed upon the cable of one of the winch assemblies of the portable, self-erecting silo apparatus of the present invention.

FIG. 9 is an enlarged, partially broken, perspective view of the support frame of the portable, self-erecting silo apparatus, depicting aligned recess portions formed therein for supportably receiving the conveyor when the conveyor is in the stored position.

DETAILED DESCRIPTION OF THE INVENTION

Figure 1:
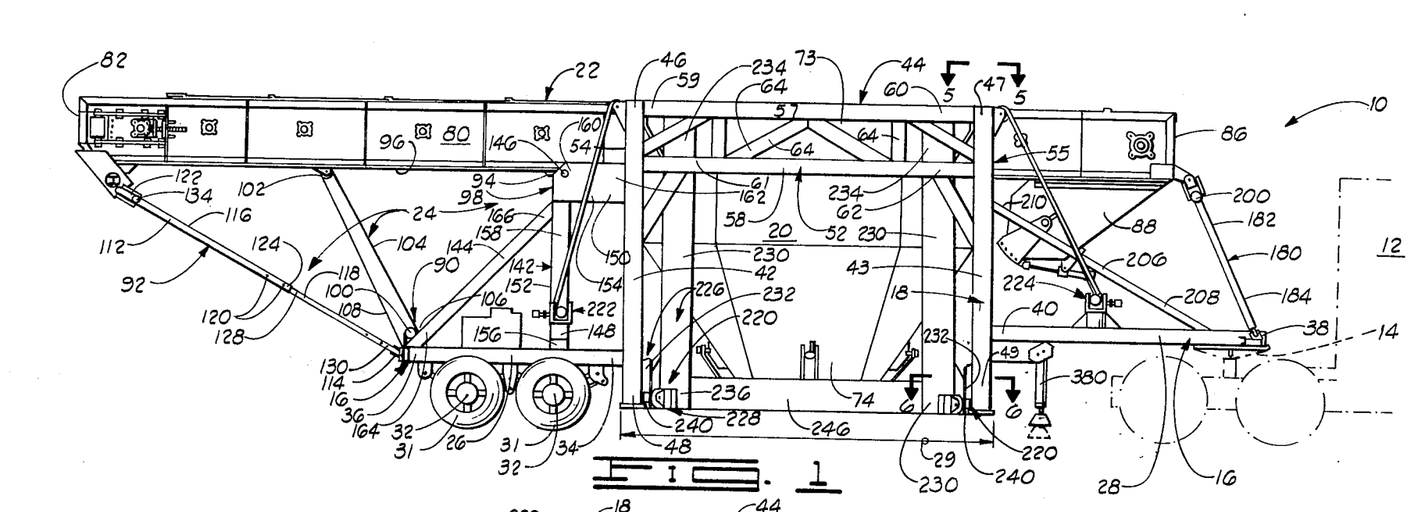
FIG. 1 is a side elevational view of the portable, self-erecting silo of the present invention, the apparatus being connected to a tractor, shown in phantom, and having the conveyor in the stored position.

Referring to the drawings, and particularly to FIG. 1, a portable, self-erecting silo apparatus 10 constructed in accordance with the present invention is operatively connected to a tractor 12 (shown in phantom) by a conventional fifth wheel 14. The portable, self-erecting silo apparatus 10 comprises a chassis 16, a support frame 18, a container 20, a conveyor 22, and a pivot means 24. The pivot means 24 pivotally connects the conveyor 22 to the chassis 16 for moving the conveyor 22 between a first storage position (shown in FIG. 1), an intermediate position (depicted in FIG. 2), and an operative position (depicted in FIG. 3).

Referring to FIGS. 1-4, the chassis 16 is provided with a first end portion 26 and an opposed second end portion 28. The first end portion 26 is spaced a distance 29 from the opposed second end portion 28. The support frame 18 is disposed between and interconnects the first end portion 26 and the opposed second end portion 28 of the chassis 16. Thus, the support frame 18 and the first and opposed second end portions 26, 28 of the chassis 16 define a passageway 30 (depicted in FIG. 3) for passage of a vehicle therethrough when the portable, self-erecting silo apparatus 10 is in an operative position.

The first end portion 26 of the chassis 16 is mounted on a plurality of wheels 31 by axles 32. The axles 32 are secured to the first end portion 26 of the chassis 16 by any suitable means well known in the art. The fifth wheel 14 for operably connecting the portable, self-erecting silo apparatus 10 to the tractor 12 is connected to the opposed second end portion 28 of the chassis 16 as shown in FIG. 1.

The first end portion 26 of the chassis 16 is provided with a forward end portion 34 and a reqrward end portion 36; and, the opposed second end portion 28 of the chassis 16 is provided with a forward end portion 38 and a opposed rearward end portion 40. As previously indicated, the forward end portion 34 of the first end portion 26 of the chassis 16 is maintained the distance 29 from the rearward end portion 40 of the opposed second end portion 28 of the chassis 16. The support frame 18 (which is adapted to telescopically receive the container 20 when the container is in an inoperative first position, as will be described in detail hereinafter) is disposed between the forward end portion 34 of the first end portion 26 and the rearward end portion 40 of the opposed second end portion 28 of the chassis 16.

Figure 2:
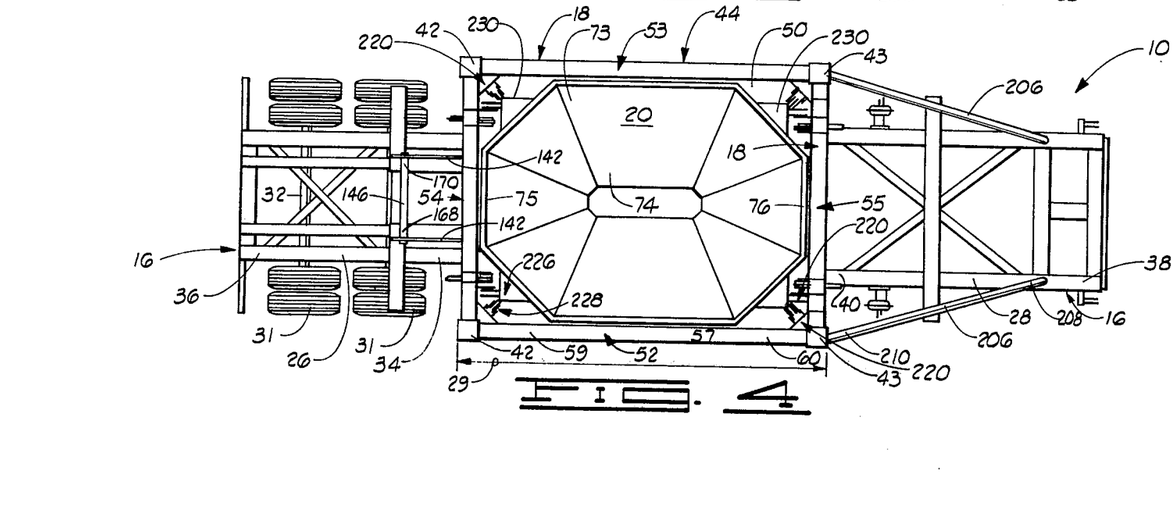
FIG. 2 is a side elevational view of the portable, self-erecting silo apparatus of the present invention depicting the conveyor in the intermediate position.

The support frame 18 comprises a plurality of upright legs 42, 43, and a laterally extending upper frame 44. The upright legs 42, 43 are each provided with an upper end portion 46, 47, respectively, and a lower end portion 48, 49, respectively. As more clearly depicted in FIG. 4, two of the upright legs 42 are connected to the forward end portion 34 of the first end portion 26 of the chassis 16, and two of the upright legs 43, are connected to the rearward end portion 40 of the opposed second end portion 28 of the chassis 16. The laterally extending upper frame 44 is secured to the upper end portions 46, 47 of the upright legs 42, 43, respectively, such that an opening 50 (shown in FIG. 4) is formed therein for receiving the container 20 when the container 20 is in the first position as depicted in FIG. 1 and 2.

Referring now to FIGS. 1-4 and 9, the laterally extending upper frame of 44 comprises a first side 52, an opposed second side 53, a first end 54, and an opposed second end 55. As previously stated, the first side 52, the opposed second side 53, the first end 54, and the opposed second end 55 are connected together to form the substantially rectangular shaped opening 50 as depicted more clearly in FIG. 4. The first side 52 and the opposed second side 53 of the laterally extending upper frame 44 are substantially identical, as are the first end 54 and the opposed second end 55. Thus, only the configuration and structure of the first side 52 and the first end 54 will be described in detail.

Figure 3:
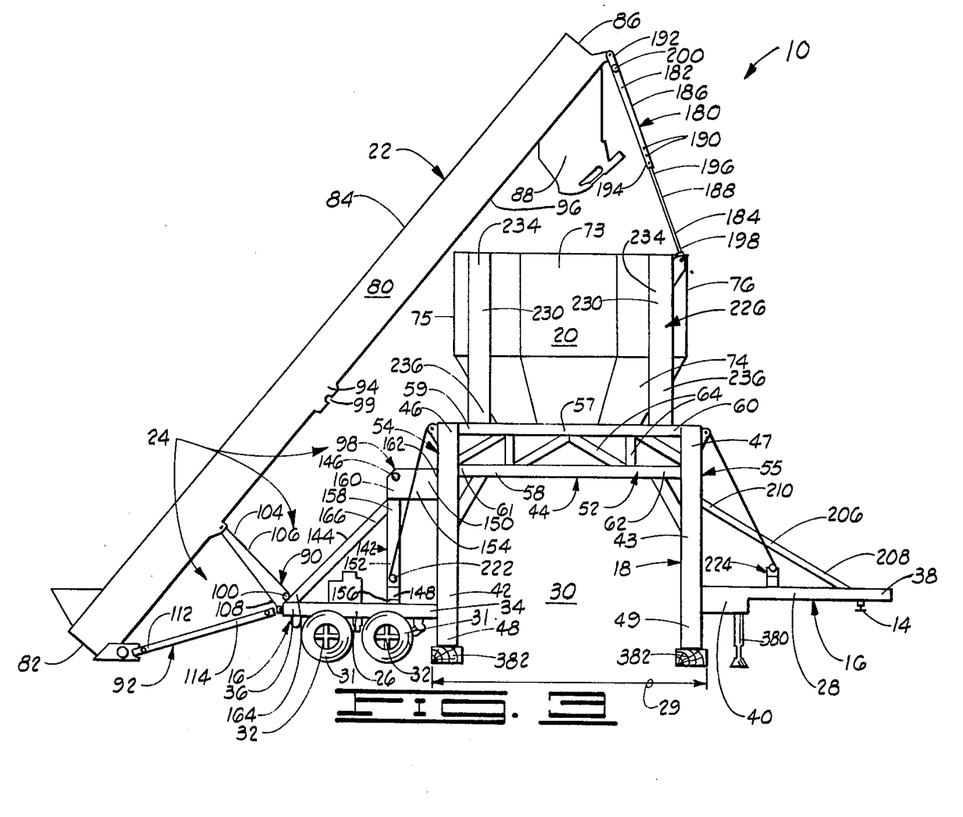
FIG. 3 is a side elevational view of the portable, self-erecting silo apparatus of the present invention depicting the conveyor and the container of the apparatus in the raised operative position.

The first side 52 comprises an upper member 57 and a lower member 58. The upper member 57, an elongated member, is provided with a first end 59 and an opposed second end 60. The first end 59 of the upper member 57 is secured to the upper end portion 56 of one of the upright leg 42 of the support frame 18; and, the opposed second end 60 of the upper member 57 is secured to the upper end portion 47 of one of the upright leg 43 of the support frame 18. The lower member 58 of the laterally extending upper frame 44 is provided with a first end 61 and an opposed second end 62. The first end 61 of the lower member 58 is secured to one of the upright leg 42 of the support frame 18; and, the opposed second end 62 of the lower member 58 is secured to one of the upright leg 43 such that the lower member 58 is positioned a distance from the upper member 57. Further, the lower member 58 is positioned on the upright legs 42, 43 of the support frame 18 in a parallel, spatial relationship with the upper member 57 such that the upright legs 42, 43 and the lower member 58 define the passageway 30 for passage of a vehicle therethrough when the portable, self-erecting silo apparatus 10 is in the operative position as depicted in FIG. 3. A plurality of support members 64 are disposed between the upper member 57 and the lower member 58 of the first side 52 of the laterally extending upper frame 44 to reinforce same.

Referring now to FIG. 9, the first end 54 of the laterally extending upper frame 44 (which, as previously stated is substantially identical to the opposed second end 55 of the laterally extending upper frame 44) comprises a cross-support member 65 having a first end 66 and an opposed second end 67. The first end 66 of the cross-support member 65 is secured to one of the upright legs 42 and the opposed second end 67 of the cross-support member 65 is secured to the adjacent upright leg 42. The cross-support member 65, an elongated member, is secured to the two upright legs 42 a distance from the upper end portion 46 substantially as shown in FIG. 9. A pair of upright support members 69 are positioned upon and secured to the cross-support member 65, the upright support members 69 and the cross-support member 65 defining a recessed portion 70 in the first end 54 of the laterally extending upper frame 44. As previously indicated, the opposed second end 55 of the laterally extending upper frame 44 is constructed substantially identical to the first end 54 and thus is provided with a recessed portion 71 similar to the recessed portion 70 of the first end 54. The recessed portion 70 (of the first end 54) and the aligned recess portion 71 (of the opposed second end 55) of the laterally extending upper frame 44 are adapted to receive the conveyor 22 when the conveyor 22 is in the stored position as will be more fully described hereinafter.

In order to reinforce the upright support members 69, cross-support members, such as cross-support members 72 can be disposed between and secured to the upright support member 69 and the upper end portion 46 of the adjacent upright leg 42 of the support frame 18 substantially as shown in FIG. 9.

Referring now to FIGS. 1-4 and 10, the container 20 (positionable within the opening 50 of the support frame 18) is provided with an upper end portion 73 and a lower end portion 74. The upper end portion 73 of the container 20 (depicted in FIG. 4 as having an octagonal configuration) is provided with a first end portion 75 and an opposed second end portion 76. The first end portion 75 of the upper end portion 73 of the container 20 is disposed adjacent the recessed portion 70 formed in the first end 54 of the laterally extending upper frame 44 (as hereinbefore described); and, the opposed second end portion 76 of the upper end portion 73 of the container 20 is disposed substantially adjacent the recessed portion 71 formed in the opposed second end 55 of the laterally extending upper frame 44. The first end portion 75 of the upper end portion 73 of the container 20 is provided with a recessed portion 77, the recessed portion 77 being substantially aligned with the recessed portion 70 in the first end 54 of the laterally extending upper frame 44. The opposed second end portion 76 of the upper end portion 73 of the container 20 is provided with a recessed portion 78 which is substantially aligned with the recessed portion 71 in the opposed second end 55 of the laterally extending upper frame 44. Thus, when the container 20 is disposed within the support frame 18, the recessed portions 77, 78 of the first and opposed second end portions 75, 76, respectively, of the upper end portion 73 of the container 20 cooperate with the recessed portions 70, 71, of the first and opposed second ends 54, 55 of the laterally extending upper frame 44 for receiving the conveyor 22 when the conveyor 22 is in the stored position as depicted in FIG. 1. Further, the recessed portion 70, 71 in the support frame 18, and the recessed portions 77, 78 in the upper end portion 73 of the container 20 receive a portion of the conveyor 22 when the conveyor is moved between the stored position and the intermediate position, as depicted in FIGS. 1 and 2.

Referring to FIGS. 1–3, the conveyor 22 is of substantially conventional construction and comprises an elongated conveyor housing 80 having an inlet end portion 82, a medial portion 84, and an opposed outlet end portion 86. An internal conveyor mechanism (not shown) is provided within the conveyor housing 80 and functions to carry material from the inlet end portion 82 of the conveyor housing 80 to the opposed outlet end portion 86. A conveyor drive motor (not shown) is mounted at the discharge end of the conveyor housing 80, and a drop chute 88 functions to funnel the material discharged from the conveyor 22 in a downward direction into the container 20.

As previously stated, the container 20 is provided with the upper end portion 73 and the lower end portion 74. The lower end portion 74 of the container 20 is a converging lower end portion. The container 20 is positionable within the opening 50 of the laterally extending upper frame 44 such that the container 20 is telescopically received therein in a first position (the position wherein the conveyor 22 is in one of the stored or the intermediate position) and movable to a raised second position wherein the container 20 is disposed above the passageway 30 defined by the laterally extending upper frame 44 and the upright legs 42, 43 of the support frame 18.

The pivot means 24 of the portable, self-erecting silo apparatus 10 pivotably connects the conveyor 22 (via the inlet end portion 82 and the medial portion 84) to the first end portion 26 of the chassis 16. Thus, the pivot means 24 permits movement of the conveyor 22 between the stored position (as depicted in FIG. 1), the intermediate position (as depicted in FIG. 2), and the operative position (as depicted in FIG. 3).

The pivot means 24 comprises a winch assembly 90 and a linkage assembly 92. Further, the pivot means 24 comprises a bracket 94 mounted on a lower side 96 of the conveyor housing 80 and a support assembly 98 mounted on the forward end portion 34 of the first end portion 26 of the chassis 16. The support assembly 98 supportingly engaging the bracket 94 (and thus the conveyor 22) as the conveyor is moved between the stored position and the intermediate position. The winch assembly 90 of the pivot means 24 is mounted on the first end portion 26 of the chassis 16. The winch assembly 90 operably connects the inlet end portion 82 of the conveyor 22 to the forward end portion 26 of the chassis 16 such that upon activation of the winch assembly 90 the conveyor 22 is moved between the stored position and the intermediate position.

Figure 11:
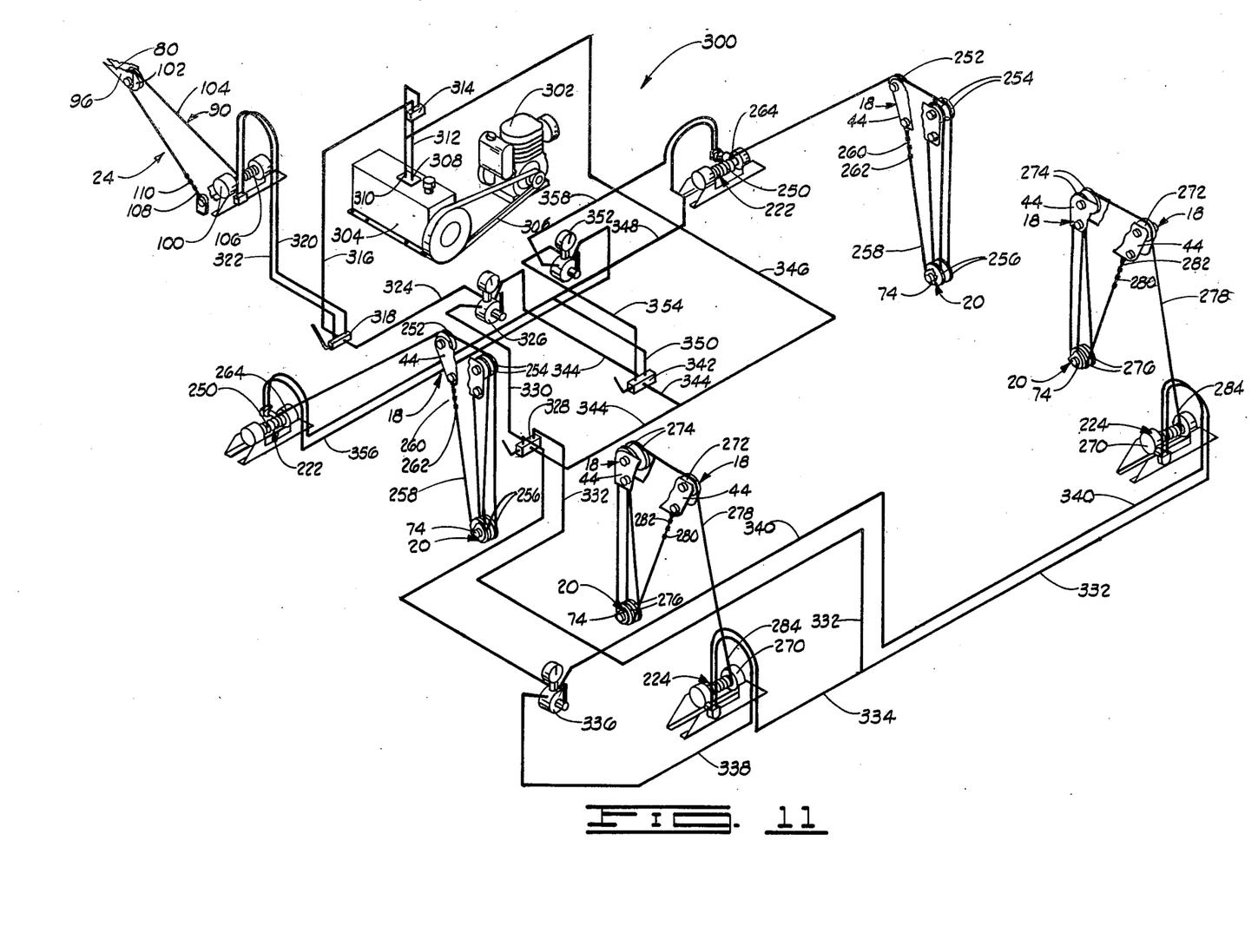
FIG. 11 is an enlarged, partially broken, schematic representation of the winch assemblies and the control means for synchronyzing the winch assemblies for raising and lowering the container with respect to the support frame of the portable, self-erecting silo apparatus of the present invention.

Referring in part to FIG. 11, in combination with FIGS. 1–3, the winch assembly 90 comprises a winch 100, a sheave 102, a cable 104 (having a first end 106 and a second end 108), and securing means, such as clamp 110, for securing the second end 108 of the of the cable 104 to the first end portion 26 of the chassis 16. The winch 100 is mounted on the first end portion 26 of the chassis 16 substantially as shown in FIGS. 1–3. Teh sheave 102 is rotatably mounted on the lower side 96 of the conveyor housing 80 at a position between the inlet end portion 82 of the conveyor housing 80 and the position of attachment of the bracket 94 to the conveyor housing 80 as shown in the drawings. The first end 106 of the cable is operably attached to the winch 100 and the cable 104 is positioned over and operably engages the sheave 102. As previously stated, the second end portion 108 of the cable 104 is secured to the first end portion 26 of the support frame 18 by the securing means, such as the clamp 110.

The linkage assembly 92 of the pivot means 24 is provided with a first end portion 112 and an opposed second end portion 114. The first end porton 112 of the linkage assembly 92 is connected to the inlet end portion 82 of the conveyor housing 80; and, the opposed second end portion 114 of the linkage assembly 92 is connected to the rearward end portion 36 of the first end portion 26 of the chassis 16. The linkage assembly 92 is movable between a first connecting position (wherein the linkage assembly 92 supports the conveyor 22 in the stored position), and a second connecting position (wherein the linkage assembly 92 secures the inlet end portion 82 of the conveyor housing 80 in a stationary position as the conveyor 22 is moved between the intermediate position and the operative position). Thus, the linkage assembly 92 maintains the inlet end portion 82 of the conveyor housing 80 (and thus the conveyor 22) in a stationary position with relation to the chassis 16 during movement of the conveyor 22 between the intermediate position and the operative position.

Referring more particularly to FIG. 1, the linkage assembly 92 of the pivot means 24 comprises a tubular linkage member 116, a linkage member 118 telescopically received by the tubular linkage member 116, and securing means 120 for securing the tubular linkage member 116 and the linkage member 118 in the first position (e.g., an extended position as shown in FIG. 1) and the second position (e.g., a retracted position as depicted in FIGS. 2 and 3).

The tubular linkage member 116 is provided with a first end portion 122 and an opposed second end portion 124. The first end portion 122 of the tubular linkage member 116 is pivotally connected to the inlet end portion 82 of the conveyor housing 80 of the conveyor 22. The opposed second end portion 124 of the tubular linkage member 116 is provided with at least one aperture (not shown) in opposite side portions thereof, the apertures being aligned one with another and thus having a central axis.

The linkage member 118 is also provided with a first end portion 128 and an opposed second end portion 130. The linkage member 118 is telescopically disposed in the tubular linkage member 116 (via the first end portion 128 of the linkage member 118 and the opposed second end portion 124 of the tubular linkage member 116) such that the opposed second end portion 130 of the linkage member 118 extends outwardly from the opposed second portion 124 of the tubular linkage member 116. The opposed second end portion 130 of the linkage member 118 is pivotally connected to the rearward end portion 36 of the first end portion 26 of the chassis 16 (e.g., the end portion of the chassis 16 disposed near the inlet end portion 82 of the conveyor housing 80 of the conveyor 22). The first end portion 128 of the linkage member 118 is provided with at least one hole (not shown) extending therethrough; and, the opposed second end portion 130 of the linkage member 118 is provided with at least one hole (also not shown) extending therethrough. The hole in the first end portion 128 of the linkage member 118 is alignable with the apertures in the opposed second end portion 124 of the tubular linkage member 116 when the conveyor 22 is in the stored position (as depicted in FIG. 1). Thus, the securing means 120, such as a bolt, pin or the like can be positioned within the aligned apertures of the opposed second end portion 124 of the tubular linkage member 116 and the hole (not shown) in the first end portion 128 of the linkage member 118. When the tubular linkage member 116 and the linkage member 118 are secured as stated above, the tubular linkage member 116 and the linkage member 118 are in the first position (e.g., the extended position). Whereas, when the hole (not shown) in the opposed second end portion 130 of the linkage member 118 is aligned with the apertures (not shown) in the opposed second end portion 124 of the tubular linkage member 116, and the securing means 120 is positioned therein, the tubular linkage member 116 and the linkage member 118 are in the second position (e.g., the retracted position) and the conveyor 22 is in one of the intermediate positions (as shown in FIG. 2) or the operative position (as shown in FIG. 3).

While the linkage assembly 92 of the pivot means 24 has been described in terms of one tubular linkage member 116 and one linkage member 118, it should be understood that for added support the linkage assembly 92 of the pivot means 24 will generally include a pair of the tubular linkage members 116, a pair of the linkage members 118, and a plurality of the securing means 120. Further, when a pair of the tubular linkage members 116, and thus a pair of the linkage members 118 are employed, the tubular linkage members 116 are positioned in a parallel spatial relationship with each other and are secured to substantially opposite side portions of the inlet end portion 82 of the conveyor housing 80. Similarly, the linkage members 118 are positioned in a parallel spatial relationship with each other and the opposed second end portion 130 of the linkage members 118 are pivotally connected to the rearward end portion 36 of the first end portion 26 of the chassis 16 so that the linkage members 118 are aligned and telescopically received by the tubular linkage members 116 as hereinbefore described. Further, when employing a pair of the tubular linkage members 116 and a pair of the linkage members 118, it is desirable to provide a support member 134 disposed therebetween to reinforce the tubular linkage member 116. The support member 134 is provided with a first end portion (not shown) and a second end portion (not shown). The first end portion of the support member 134 is connected to the first end portion 122 of one of the tubular linkage members 116; and, the second end portion of the support member 134 is connected to the first end portion 122 of the other of the tubular linkage members 116.

The bracket 94 of the pivot means 24 is, as previously stated, mounted on the lower side 96 of the conveyor housing 80 at a position substantially as depicted in FIGS. 2 and 3. The bracket 94 operably engages the support assembly 98 when the conveyor 22 is in one of the stored position or the intermediate position. Thus, the bracket 94 and the support assembly 98 pivotally support the conveyor housing 80 (and thus the conveyor 22 as the conveyor 22 is moved between the stored position and the intermediate positions substantially as shown in FIGS. 2 and 3) when a recessed portion 99 of the bracket 94 (see FIG. 3) is disposed upon and operably engages the support assembly 98.

The support assembly 98 of the pivot means 24 comprises a first brace member 142, a second brace member 144, and a support member 146. The support assembly 98, in addition to cooperating with the bracket 94 for supporting the conveyor 22 as the conveyor 22 is moved between the stored position and the intermediate position, also stablizes the support frame 18 with respect to the first end portion 26 of the chassis 16. Preferably, a pair of the first brace members 142 and a pair of the second brace members 144 are employed. However, for the sake of simplifying the description, only one of each of the first brace members 142 and the second brace members 144 will be described in detail. However, it should be noted that when a pair of the first brace members 142 are employed, the first brace members 142 are disposed in a parallel, spatial relationship with each other. Further, when a pair of the second brace members 144 are employed, the second brace members 144 are likewise disposed in a parallel, spatial relationship.

The first brace member 142 is provided with a first end portion 148 and a second end portion 150. The first end portion 148 of the first brace member 142 is positioned upon and secured to the first end portion 26 of the chassis 16. The second end portion 150 of the first brace member 142 is secured to the support frame 18 substantially as shown in the drawing. The first brace member 142, depicted as a substantially L-shaped member, can be formed of a first leg member 152 and a second leg member 154. The first leg member 152 is provided with a first end portion 156 and an opposed second end portion 158. The second leg member 154 is likewise provided with a first end portion 160 and an opposed second portion 162. The first end portion 156 of the first leg member 152 is secured to the first end portion 26 of the chassis 16 such that the first leg member is maintained in a parallel, spatial relationship with respect to the upright legs 42 of the support frame 18. The opposed second end portion 158 of the first leg member 152 is secured to the first end portion 160 of the second leg member 154 such that the longitudinal axis of the second leg member 154 is substantially perpendicular to the longitudinal axis of the first leg member 152. The opposed second end portion 162 of the second leg member 154 is secured to the support frame 18 as shown in the drawings.

The second brace member 144 is provided with a first end portion 164 and a second end portion 166. The first end portion 164 of the second brace member 144 is mounted upon and secured to the first end portion 26 of the chassis 16 a distance removed from the point of attachment of the first end portion 148 of the first brace member 142. The second end portion 166 of the second brace member 144 is secured to the first leg member 152 of the first brace member 142. Thus, the second end portion 166 of the second brace member 144 is secured to the first brace member 142 at a position between the first end portion 148 and the second end portion 150 of the first brace member 142 substantially as shown in FIGS. 1–3.

Referring now to FIG. 9, in combination with FIGS. 1–3, the support member 146 is provided with a first end 168 and an opposed second end 170. The first end 168 of the support member 146 is mounted on the first brace member 142 (e.g., an upper portion of the first end portion 160 of the second leg member 154) and the opposed second end 170 of the support member 146 is mounted on a second first brace member 142 (e.g., an upper portion of the first end portion 160 of the second leg member 154). Thus, the support member 146 is disposed between the pair of first brace members 142 such that the support member 146 is transversely disposed with relation to the longitudinal axis of the conveyor 22. The support member 146 operably engages the recessed portion 99 of the bracket 94 when the conveyor 22 is in one of the stored or intermediate positions. Thus, the support member 146 and the bracket 94 cooperate for pivotable support of the conveyor 22 when the conveyor 22 is moved between the stored position and the first intermediate position as depicted in FIGS. 1 and 2.

In order to support and stabilize the outlet end portion 86 of the conveyor housing 80 (and thus the conveyor 22) the portable, self-erecting silo apparatus further comprises a forward linkage assembly 180. In one connective position the forward linkage assembly 180 secures the opposed outlet end portion 86 of the conveyor housing 80 to the opposed second end portion 28 of the chassis 16 (as depicted in FIG. 1 when the conveyor 22 is in the stored position). In a second connecting position, the forward linkage assembly 180 secures the outlet end portion 86 of the conveyor housing 80 to the upper end portion 73 of the container 20 (as depicted in FIGS. 2 and 3 when the conveyor 22 is in one of the intermediate position on the operative position). Thus, in the second connecting position the forward linkage assembly 180 secures the outlet end portion 86 of the conveyor housing 80 to the upper end portion 73 of the container 20.

Referring more specifically to FIGS. 2 and 3, the forward linkage assembly 180 is provided with a first end portion 182 and an opposed second end portion 184. As indicated above, the forward linkage assembly 180 is movable between the first connecting position and the second connecting position. In the first connecting position the first end portion 182 of the forward linkage assembly 180 is connected to the opposed outlet end portion 86 of the conveyor housing 80 and the opposed second end portion 184 of the forward linkage assembly 180 is connected to the forward end portion 38 of the opposed second end portion 28 of the chassis 16. In the second connecting position of the forward linkage assembly 180 the first end portion 182 of the forward linkage assembly 180 is connected to the opposed outlet end portion 86 of the conveyor housing 80; and, the opposed second end portion 184 of the forward linkage assembly 180 is connected to the upper end portion 73 of the container 20 as depicted in FIGS. 2 and 3.

The forward linkage assembly 180 desirably comprises a pair of tubular linkage members 186, a pair of linkage members 188 telescopically disposed in the tubular linkage members 186 and a plurality of securing means 190, such as pins, bolts and the like, for securing one of the linkage members 188 within one of the tubular linkage members 186 in the first position (e.g., the retracted position as depicted in FIG. 1) or in the second connecting position (e.g., the extended position as depicted in FIGS. 2 and 3). While the forward linkage assembly 180 desirably comprises a pair of the tubular linkage members 186 (which are secured to the opposed outlet end portion 86 of the elongated conveyor housing 80 so as to be in a parallel, spatial relationship with each other) and a pair of linkage members 188 (one of which is disposed in each of the tubular linkage members 186 for attachment to either the opposed second end portion 28 of the chassis 16 or the upper end portion 73 of the container 20, as hereinbefore described), and since each of the tubular linkage members 186 and the linkage members 188 are substantially identical in construction, and further for the sake of simplicity, only one of each of the tubular linkage members 186 and the linkage members 188 will be described in detail.

The tubular linkage member 186 of the forward linkage assembly 180 is provided with a first end portion 192 and an opposed second end portion 194. The first end portion 192 of the tubular linkage member 186 is pivotably connected to the opposed outlet end portion 86 of the conveyor housing 80. The opposed second end portion 194 of the tubular linkage member 186 is provided with at least one aperture (not shown) in opposite side portion thereof, the apertures being aligned one with another and having a central axis.

The linkage member 188 is likewise provided with a first end portion 196 and an opposed second end portion 198. The first end portion 196 of the linkage member 188 is telescopically disposed in the tubular linkage member 186 via the opposed second end portion 194 of the tubular linkage member 186 such that the opposed second end portion 198 of the linkage member 188 extends a distance outwardly from the opposed second end portion 194 of the tubular linkage member 186. The opposed second end portion 198 of the linkage member 188 is pivotally connected to the forward end portion 38 of the opposed second end portion 28 of the chassis 16 when the conveyor 22 is in the stored position (as depicted in FIG. 1). On the other hand, the opposed second end portion 198 of the linkage member 188 is pivotally connected to the upper end portion 73 of the container 20 when the conveyor 22 is in either the intermediate position or the operative position (as depicted in FIGS. 2 and 3).

The first end portion 196 of the linkage member 188 is provided with at least one hole (not shown) extending therethrough; and, the opposed second end portion 198 of the linkage member 188 is also provided with at least one hole (not shown) extending therethrough. The hole (not shown) in the opposed second end portion 198 of the linkage member 188 is alignable with the apertures (not shown) in the side portions of the opposed second end portion 194 of the tubular linkage member 186 when the tubular linkage member 186 and the linkage member 188 are in a retracted position (e.g., when the conveyor 22 is in the stored position) so that the securing means 190 can be positioned within the aligned apertures and the hole of the opposed second end portion 194 of the tubular linkage member 186 and the opposed second end portion 198 of the linkage member 188, respectively. On the other hand, when the tubular linkage member 186 and the linkage member 188 are in an extended position (e.g., when the conveyor 22 is in the intermediate position or the operative position as depicted in FIGS. 2 and 3) the hole (not shown) in the first end portion 196 of the linkage member 188 is aligned with the apertures (not shown) in the side portions of the opposed second end portion 194 of the tubular linkage member 186 so that the securing means 90 can be positioned therethrough for securing the tubular linkage member 186 and the linkage member 188 in the extended position.

As previously indicated, it is generally desirable that the forward linkage assembly 180 comprise a pair of the tubular linkage members 186 and a pair of the linkage members 188. In such instances the forward linkage assembly 180 further comprises a cross-support member 200. The cross-support member 200 is disposed between the pair of tubular linkage members 186 and secured thereto by any suitable means. For example, the cross-support member 200 is provided with a first end portion (not shown) and a second end portion (also not shown). The first end portion of the cross-support member 200 is connected to the first end portion 192 of one of the tubular linkage members 186; and, the second end portion of the cross-support member 200 is secured to the first end portion 192 of the other of the tubular linkage members 186.

Figure 4:
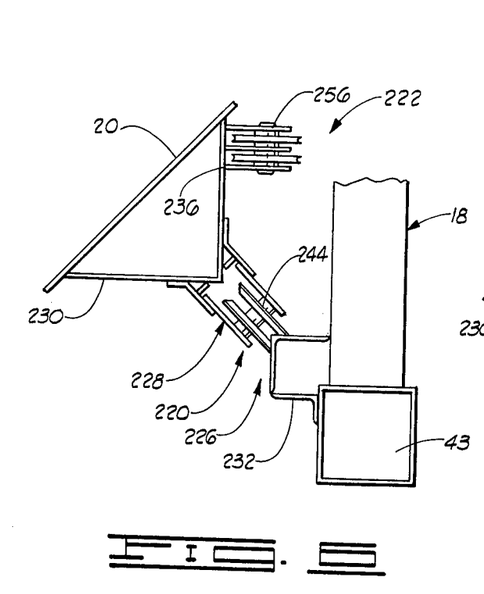
FIG. 4 is a top plan view of the portable, self-erecting silo apparatus of the present invention having the conveyor removed therefrom.
Figure 5:
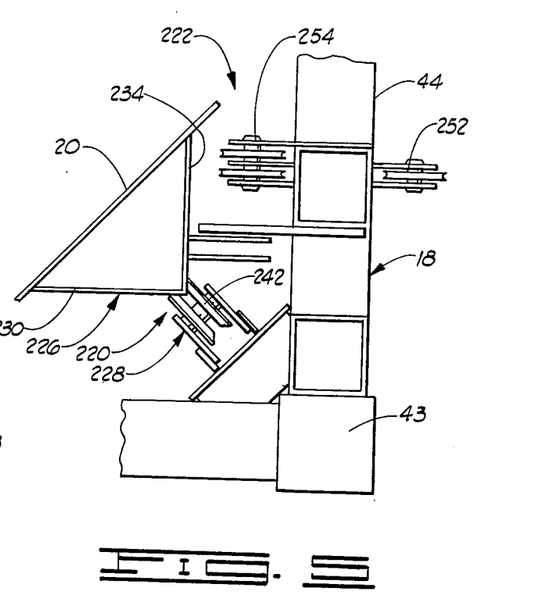
FIG. 5 is an enlarged, partially broken top plan view of the portable, self-erecting silo apparatus of FIG. 1 taken along the line 5—5, without the cable operably connected thereto.
Figures 6, 7:
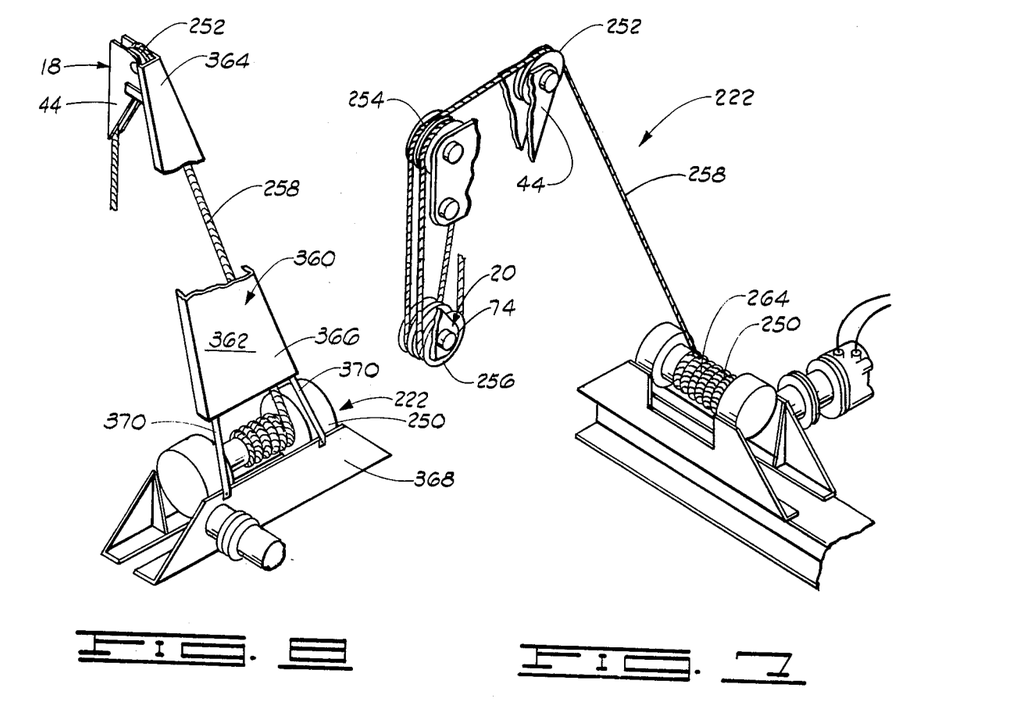
FIG. 6 is an enlarged, partially broken view of the portable, self-erecting silo apparatus of FIG. 1 taken along the lines 6—6, without the cable operably connected thereto.
FIG. 7 is an enlarged, partially broken perspective view of one of the winch assemblies employed to raise and lower the container with respect to the support frame.
Figure 10:
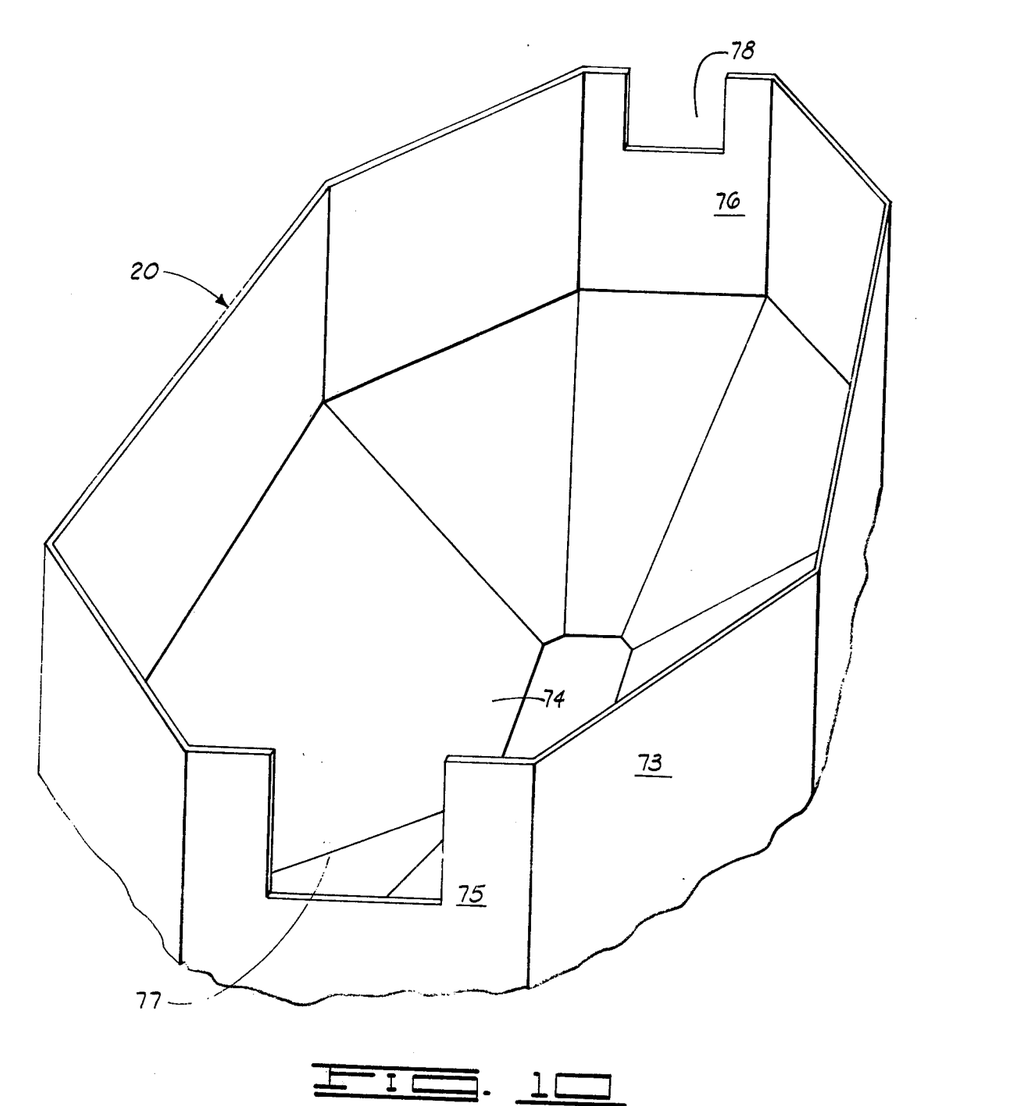
FIG. 10 is an enlarged, partially broken, perspective view of the container of the portable, self-erecting silo apparatus, depicting aligned recess portions formed therein, the aligned recess portions of the container being aligned with the recess portions of the support frame (as depicted in FIG. 9) when the container is disposed within the support frame.

Referring to FIGS. 1–4, the portable, self-erecting silo apparatus 10 further comprises at least one brace member 206 for stabilizing and supporting the support frame 18 with respect to the opposed second end portion 28 of the chassis 16. Preferably, a pair of the brace members 206 are employed and the brace members 206 are disposed in a spatial relationship with each other (as depicted in FIG. 4). However, for the sake of simplifying the description, only one of the brace members 206 will be described. The brace member 206 is provided with a first end portion 208 and an opposed second end portion 210. The first end portion 208 of the brace member 206 is secured to the support frame; and, the opposed second end portion 210 of the brace member 206 is secured to the opposed second end portion 28 of the chassis 16.

The portable, self-erecting silo apparatus 10 further comprises a plurality of guide assemblies 220, a first winch assembly 222 and a second winch assembly 224. The guide assemblies 220 (which are operably disposed between the container 20 and the support frame 18) maintain the container 20 in a predetermined relationship with the support frame 18 as the container 20 is moved between the first position (as depicted in FIGS. 1 and 2) and the raised second position (as depicted in FIG. 3). The guide assemblies 220 are disposed so as to be substantially adjacent each of the upright legs 42, 43 of the support frame 18. Each of the guide assemblies 220 are substantially identical in construction. Thus, only one of the guide assemblies 220 will be described in detail.

Referring now to FIGS. 1–7, the guide assembly 220 comprises a substantially vertically extending track assembly 226 and a roller assembly 228. The track assembly 226 is disposed between one of the upright legs of the support frame 18, such as the upright leg 43, and the container 20. The roller assembly 228 is mounted on either the container 20 or the support frame 18 and operably engages the track assembly 226 for rolling engagement thereon as the container 20 is moved between the first position and the raised second position.

The track assembly 226 comprises a first leg member 230 and a second leg member 232. The first leg member 230 is provided with an upper end portion 234 and a lower end portion 236. The upper end portion 234 of the first leg member 230 is secured to the upper end portion 73 of the container 20; and, the lower end portion 236 of the first leg member 230 is secured to the converging lower end portion 74 of the container 20 such that the first leg member 230 is disposed in a parallel, spatial relationship with the upright leg 43 of the support frame 18.

The second leg member 232 of the track assembly 226 is provided with an upper end portion (not shown) and a lower end portion 240. The upper end portion (not shown) of the second leg member 232 is secured to the support frame 18 such that the lower end portion 240 of the second leg member 232 terminates a distance from the supporting surface, the distance being substantially equal to the distance between the lower end portion 48 of the upright leg 42 of the support frame 18 and the supporting surface. The upper end portion 238 of the second leg member 232 terminates a distance from a first guide roller 242 of the roller assembly 228 so as to not interfere with the operation of the first guide roller 242. Thus, the second leg member 232 of the track assembly 226 is secured to the support frame 18 such that the second leg member 232 is substantially adjacent and parallel the upright leg 43 of the support frame 18.

The roller assembly 228 comprises the first guide roller 242 and a second guide roller 244. The first guide roller 242 is secured to the upper end portion 46 of the upright leg 43 of the support frame 18 such that the first guide roller 242 is operably aligned for rolling engagement with the first leg member 230 of the track assembly 226. The second guide roller 244 is secured to the lower end portion 236 of the first leg member 230 of the track assembly 226 such that the second guide roller 244 is operably aligned for rolling engagement with the second leg member 232 of the track assembly 226. Thus, the first guide roller 242 and the second guide roller 244 of the roller assembly 228, in combination with the first leg member 230 and the second leg member 232 of the track assembly 226, guide the movement of the container 20 between the first position wherein the container 20 is disposed within the support frame 18 (as depicted in FIGS. 1 and 2) to the raised second position wherein the container 20 is disposed above the support frame 18 (as depicted in FIG. 3).

Referring again to FIGS. 1 and 2, the container 20 of the portable, self-erecting silo apparatus 10 further comprises a lower support frame 246. The lower support frame 246 interconnects and supports the lower end portion 236 of the first leg member 230 of the track assembly 226 substantially as shown.

Referring now to FIGS. 1–7, and 11, the container 20 can readily be moved between the first position and the raised second position by the cooperation and coaction of the first winch assembly 222, the second winch assembly 224, the track assembly 226, and the roller assembly 228. The first winch assembly 222 is mounted on the first end portion 26 of the chassis 16. The support frame 18 and the adjacent lower end portion 74 of the container 20 are operably connected by the first winch assembly 222. The second winch assembly 224 is mounted on the opposed second end portion 28 of the chassis 16 so as to be substantially opposite the first winch assembly 222. The support frame 18 and the adjacent lower end portion 34 of the container 20 are operably connected via the second winch assembly 224. As will be more evident hereinafter, the first and second winch assemblies 222, 224 cooperate to move the container 20 between the first position and the raised second position. Desirably, two of the first winch assemblies 222 and two of the second winch assemblies 224 are employed to move the container 20 from the first position to the raised second position.

Referring now to FIGS. 5-8 and 11, the first winch assembly 222 comprises a first winch 250, a first sheave 252, a pair of second sheaves 254, a pair of third sheaves 256, a cable 258, and securing means 260 (see FIG. 11) for securing a second end 262 of the cable 258 to the laterally extending upper frame 44 of the support frame 18 substantially adjacent the first sheave 252. The first sheave 252 is operably mounted on an exterior portion of the laterally extending upper frame 44 such that the first sheave 252 is operably aligned with the first winch 250. The pair of second sheaves 254 is operably mounted on the laterally extending upper frame 44 of the support frame 18 so as to be substantially oppositely disposed to the first sheave 252. Thus, the pair of second sheaves 254 are disposed between the laterally extending upper frame 44 of the support frame 18 and the container 20. Further, the pair of second sheaves 254 are operably aligned with the first sheave 252.

The pair of third sheaves 256 is operably mounted on the lower end portion 74 of the container 20 so that the pair of third sheaves 256 are operably aligned with the pair of second sheaves 254. The cable 258 is provided with a first end 264 and the second end 262. The first end 264 of the cable 258 is operably connected to the first winch 250 such that the cable is positioned upon and operably engages the first, second, and third sheaves, 252, 254, and 256, respectively, and the second end 262 of the cable 258 is secured to the laterally extending upper frame 44 of the support frame 18 by the securing means 260. As shown in FIG. 11, the second end 262 of the cable 258 is secured to the laterally extending upper frame 44 at a position substantially adjacent the first sheave 252.

Referring now to FIG. 11, the second winch assembly 224 comprises a winch 270, a first sheave 272, a pair of second sheaves 274, a pair of third sheaves 276, a cable 278, and securing means 280 for securing a second end 282 of the cable 278 to the laterally extending upper frame 44 of the support frame 18. The second end 282 of the cable 278 is secured to the laterally extending upper frame 44 so as to be substantially adjacent the first sheave 272 secured to the laterally extending upper frame 44 as shown in the drawing. The winch 270 is mounted on the opposed second end portion 28 of the chassis 16 so as to be substantially opposite the winch 250 of the first winch assembly 222 as hereinbefore set forth.

The first sheave 272 of the second winch assembly 224 is mounted on an exterior of the laterally extending upper frame 44 of the support frame 18 such that the first sheave 272 is operably aligned with the winch 270. The pair of second sheaves 274 is operably mounted on the laterally extending upper frame 44 of the support frame 18 so as to be substantially opposite the first sheave 272. The pair of second sheaves 274 are disposed between the laterally extending upper frame 44 of the support frame 18 and the container 20. Thus, the pair of second sheaves 274 are operably aligned with the first sheave 272. The pair of third sheaves 276 is operably mounted on the lower end portion 74 of the container 20 such that the pair of third sheaves 276 are operably aligned with the pair of second sheaves 274.

The cable 278 is provided with a first end 284 and the second end 282. The first end 284 of the cable 278 is operably connected to the winch 270 such that the cable is positioned upon and operably engages the first, second and third sheaves, 272, 274, and 276, respectively, and the second end 282 of the cable 278 is secured to the laterally extending upper frame 44 of the support frame 18 by the securing means 280. The second end 282 of the cable 278 is secured to the laterally extending upper frame 44 of the support frame 18 so as to be substantially adjacent the sheave 272.

The winches 250 of the first winch assembly 222 (two being depicted) and the winches 270 of the second winch assembly 224 (two also being depicted) are hydraulic activated winches and are interconnected by a hydraulic system generally represented by the numeral 300. The hydraulic system 300, which will be described in detail hereinafter synchronizes each of the winches 250 of the first winch assembly 222, each of the winches 270 of the second winch assembly 224, and the winches 250 of the first winch assembly 222 with the winches 270 of the second winch assembly 224 to control the movement of the container 20 between the first position and the raised second position. Further, the winch 100 of the pivot means 24 is operably connected to the hydraulic system 300 so that the winch 100 (also a hydraulic winch) can be readily activated by the hydraulic system 300.

The hydraulic system 300 is provided with a hydraulic source, such as an engine 302 and a hydraulic pump 304. The engine 302 and the hydraulic pump 304, which are operably connected via a belt 306, are mounted on the first end portion 26 of the chassis 16. The pump 304 is provided with a pressure supply outlet 308 and a return inlet 310. A conduit 312 is operably connected to the pressure supply outlet 308 of the pump 304 and a relief valve 314. A conduit 316 is operably connected to the relief valve 314 and a first control valve 318. The winch 100 of the winch assembly 90 of the pivot means 24 is operably connected to the first control valve 318 via pressure supply conduits 320, 322. The winch 100 is a double action winch (e.g., under positive action in both directions).

A conduit 324 operably connects the pressure control valve 318 to a first leveling valve 326. The first leveling valve 326 is operably connected to and in fluid communication with a second control valve 328 via pressure conduit 330. The second control valve 328 is operably connected to the winches 270 of the second winch assembly 224 via pressure supply conduit 332 (and pressure supply conduit 334 which intersects and establishes fluid communication between one of the winches 270 and the pressure supply conduit 332 as illustrated in the drawing). The second control valve 328 is also operably connected to a second leveling valve 336. The second leveling valve 336 is operably connected to each of the two winches 270 via conduits 338, 340. Thus, the second leveling valve 336 synchronizes the movement of the two winches 270.

The third control valve 342 is also operably connected to the second control valve 328 via conduit 344 and to return inlet 310 of the pump 304 via conduit 346. As illustrated, the conduit 346 intersects and is in fluid communication with the conduit 344.

The first winches 250 of the first winch assembly 222 are interconnected via a conduit 348. The third control valve 342 is operably connected to the two first winches 250 via conduit 350. As shown, conduit 350 intersects conduit 348 so as to establish fluid communication therebetween. The third control valve 342 is also operably connected to a third leveling valve 352 via conduit 354. The third leveling valve 352 is operably connected to the two winches 250 of the first winch assembly 222 via conduits 356, 358. The first winches 250 of the first winch assembly 222 and the winches 270 of the second winch assembly 224 are double acting winches (maintained under pressure in movement in both directions). Further, the incorporation of the control valves 318, 328, and 342, in combination with the leveling valves 326, 336, and 352 enable one to not only control the raising and lowering of the container 20 (via the winches 250 of the first winch assembly 222 and the winches 270 of the second winch assembly 224), but also to synchronize the winches 250 one with another, the winches 270 one with another, and the winches 250 with the winches 270. Further, the first control valve 318 enables one to activate the winch 100 of the pivot means 24 to move the conveyor 22 between the stored position, the intermediate position, and the operative position.

Referring now to FIG. 8, the portable, self-erecting silo apparatus 10 further comprises a shield assembly 360 operably positioned over the cables of the first and second winch assemblies, such as the cable 258 of the first winch assembly 222. The shield assembly 360 comprises a body member 362 having an upper end portion 364 and a lower end portion 366. The upper end portion 364 of the body member 362 is secured to the laterally extending upper frame 44 of the support frame 18 such that the upper end portion 364 of the body member 362 is substantially adjacent the first sheave 252 of the first winch assembly 222. The lower end portion 366 of the body member 362 is secured to a housing 368 disposed about the winch 250 of the first winch assembly 222 by a plurality of support members 370. The shield assembly 360 is a protective device to prevent persons from being harmed by the movement of the cable 258 during the raising and lowering of the container 20.

Referring now to FIGS. 1, 2 and 3, the portable, self-erecting silo apparatus 10 further comprises at least one landing gear 380 mounted on the opposed second end portion 28 of the chassis 16. The landing gear 380, a telescoping landing gear, is attached to the chassis 16 so as to be movable between an operative ground engaging first position (as depicted in FIGS. 2 and 3) and an inoperative raised position (as depicted in FIG. 1). Desirably, for stabilizing the chassis 16 when the chassis 16 is detached from the towing vehicle, two landing gears 380 are mounted on the opposed second end portion 28 of the chassis 16. Further, to assist in the stabilizing of the portable, self-erecting silo apparatus 10, a plurality of temporary support members, such as block members 382 can be disposed between the lower end portion of the support frame 18 and the ground surface supporting the apparatus 10. The use of the block members 382 is depicted in FIGS. 2 and 3 of the drawings.

OPERATION

The operation of the portable, self-erecting silo apparatus 10 of the present invention will now be described with reference to FIGS. 1, 2 and 3. Referring specifically to FIG. 1, the portable, self-erecting silo apparatus 10 of the present invention is in the transporting position. The container 20 is disposed within the support frame 18 in a first position and the coveyor 22 is secure in its stored position across the upper portion of the support frame 18 and the container 20. The pivot means 24 (operably connecting the inlet end portion 82 of the elongated conveyor housing 80 and the rearward end portion 36 of the first end portion 26 of the chassis 16) is secured in the extended position. The forward linkage assembly 180 is operably connected to the opposed outlet end portion 86 of the conveyor housing 80 and the forward end portion 38 of the opposed second end portion 28 of the chassis 16. Thus, the pivot means 24 and the forward linkage assembly 180 secure the conveyor 22 in the stored position. Further, the landing gear 380 is secured in the inoperative, raised position and the support block 382 are removed from the lower end portion of the support frame 18.

Once the portable, self-erecting silo apparatus 10 has been moved to the desired location, the landing gear 380 is lowered to the operative ground engaging first position and the apparatus 10 is detached from the tractor 12. Thereafter, the support blocks 382 are positioned between the lower end portion of the support frame 18 and the surface of the ground supporting the apparatus 10. The forward linkage assembly 180 is disconnected from the forward end portion 38 of the opposed second end portion 28 of the chassis 16. The securing means 120, such as bolts, are removed from the linkage assembly 92 of the pivot means 24 so that the linkage assembly 92 can be moved from the extended position to the retracted position. Thereafter, the winch 100 is activated to move the inlet end portion 82 of the conveyor housing 80 in a downward direction for engagement with the supporting surface. Once the conveyor housing 80 has been moved to the intermediate position (as depicted in FIG. 2) the linkage assembly 92 of the pivot means 24 is secured in the retracted position.

The opposed second end portion of the forward linkage assembly 180 is then pivotably connected to the upper end portion 73 of the container 20. After the forward linkage assembly 180 has been secured to the upper end portion 73 of the container 20, (and the linkage assembly 92 of the pivot means 24 secured in the retracted position) the first and second winch assemblies 222, 224 are activated, thus raising the container 20 to the raised second position. By raising the container 20 to the second raised position, the opposed outlet end portion 86 of the conveyor housing 80 is likewise raised to the operative position and disposed above the container 20. Such is depicted in FIG. 3. In order to position the apparatus 10 in a traveling condition for transporting from one location to another, the above sequence of steps are substantially reversed.

While the subject invention has been described in terms of certain preferred embodiments, and illustrated by certain drawings, such are intended for illustrative purposes only and alternatives and equivalents may readily occur to those skilled in the art without departing from the spirit or scope of the invention as set forth in the appended claims.

What is claimed is:

1. A portable, self erecting silo apparatus for temporarily storing and dispensing asphaltic mix, the apparatus comprising:
    a chassis having a first end portion and an opposed second end portion, the first end portion being spaced a distance from the opposed second end portion;
    a support frame disposed between the first end portion and the opposed second end portion of the chassis, the support frame having a laterally extending upper frame, the support frame defining a passageway between the first end portion and the second end portion of the chassis for passage therethrough of a vehicle;

a container having an upper end portion and a lower end portion, the container being movable from a first position wherein the container is telescopically received in the support frame to a raised second position wherein the container is disposed generally above the passageway defined by the support frame;

a conveyor having an inlet end portion, a medial portion, and an opposed outlet end portion; and pivot means for pivotally connecting the inlet end portion of the conveyor to one of the first and opposed second end portions of the chassis, the pivot means permitting movement of the conveyor between a stored position, an intermediate position and an operative position, in the stored position the container is maintained in the first position and the conveyor is positioned on the support frame such that the medial portion of the conveyor is supported by the support frame, in the intermediate position the container is substantially maintained in the first position, the inlet end portion of the conveyor is adjacent a support surface for the apparatus, and the outlet end portion of the conveyor is in a first raised position with relation to the support frame, in the operative position the container is maintained in the raised second position and the outlet end portion of the conveyor is maintained in a second raised position such that the outlet end portion of the conveyor is substantially centrally disposed above the upper end portion of the container.

2. The portable, self-erecting silo apparatus of claim 1 which further comprises:

at least one first winch assembly mounted on the first end portion of the chassis, the first winch assembly operably connecting the support frame and the lower end portion of the container adjacent the first end portion of the chassis; and at least one second winch assembly mounted on the opposed second end portion of the chassis, the second winch assembly operably connected to the support frame and the lower end portion of the container adjacent the opposed second end portion of the chassis, the first and second winch assemblies being disposed substantially opposite one another, the first and second winch assemblies cooperating to move the container between the first position and the raised second position.

3. The portable, self-erecting silo apparatus of claim 2 wherein the first winch assembly comprises:

a first winch mounted on the first end portion of the chassis;

a first sheave operably mounted on an exterior portion of the laterally extending frame such that the first sheave is operably aligned with the first winch;

a pair of second sheaves operably mounted to the laterally extending frame and disposed between the laterally extending frame and the container, the pair of second sheaves operably aligned with the first sheave;

a pair of third sheaves operably mounted to the lower end portion of the container, the pair of third sheaves operably aligned with the pair of second sheaves;

a cable having a first end, and a second end, the first end of the cable being secured to the first winch such that the cable is operably positioned on the first, second and third sheaves; and securing means for securing the second end of the cable to the laterally extending frame substantially adjacent the pair of second sheaves.

4. The portable, self-erecting silo apparatus of claim 3 wherein the second winch assembly comprises:

a winch mounted on the opposed second end portion of the chassis;

a first sheave mounted on an exterior portion of the laterally extending frame such that the first sheave is operably aligned with the winch;

a pair of second sheaves operably mounted on the laterally extending frame and disposed between the laterally extending frame and the container, the pair of second sheaves operably aligned with the first sheave;

a pair of third sheaves operably mounted on the lower end portion of the container, the pair of third sheaves operably aligned with the pair of second sheaves;

a cable having a first end, and a second end, the first end of the cable being secured to the winch, such that the cable is operably positioned on the first, second and third sheaves; and securing means for securing the second end of the cable to the laterally extending frame substantially adjacent the pair of second sheaves.

5. The portable, self-erecting silo apparatus of claim 4 wherein two of the first winch assemblies are mounted on the first end portion of the chassis, two of the second winch assemblies are mounted on the opposed second end portion of the chassis, and wherein the first and second winch assemblies further comprise a plurality of control means operably connected to the two first winch assemblies and the two second winch assemblies for synchronizing the two first winch assemblies, the two second winch assemblies, and the first winch assemblies with the second winch assemblies.

6. The portable, self-erecting silo apparatus of claim 5 which further comprises:

a first shield assembly operatively disposed upon the cable of each of the first winches, the first shield assembly substantially shielding a portion of the cable disposed between the first winch and the first sheave of the first winch assembly; and a second shield assembly operatively disposed upon the cable of each of the second winches, the second shield assembly substantially shielding a portion of the cable disposed between the second winch and the first sheave of the second winch assembly.

7. The portable, self-erecting silo apparatus of claim 2 wherein the pivot means comprises:

a winch assembly mounted on one of the first and opposed second end portions of the chassis, the winch assembly operably connecting the inlet end portion of the conveyor to the chassis such that the winch assembly moves the conveyor between the stored position and the intermediate position.

8. The portable, self-erecting silo apparatus of claim 7 wherein the winch assembly of the pivot means comprises:

a winch mounted on one of the first and second end portions of the chassis disposed adjacent the inlet end portion of the conveyor;

a sheave operably mounted on the inlet end portion of the conveyor;

a cable having a first end portion and a second end portion, the first end portion of the cable being secured to the winch, the cable operably engaging the sheave; and securing means for securing the second end portion of the cable to one of the first and second end portions of the chassis on which the winch is mounted.

9. The portable, self-erecting silo apparatus of claim 7 wherein the pivot means further comprises:

a linkage assembly having a first end portion and an opposed second end portion, the first end portion of the linkage assembly being connected to the inlet end portion of the conveyor, the opposed second end portion of the linkage assembly being connected to one of the first and second end portions of the chassis disposed below the inlet end portion of the conveyor when the conveyor is in the stored position, the linkage assembly being movable between a first connecting position and a second connecting position, in the first connecting position the conveyor is in the stored position and the linkage assembly secures the conveyor in the stored position, in the second position of the linkage assembly the conveyor is in one of the intermediate position and the operative position, the linkage assembly maintaining the inlet end position of the conveyor in a stationery position with relation to the chassis during movement of the conveyor between the intermediate position and the operative position.

10. The portable, self-erecting silo apparatus of claim 9 wherein the linkage assembly comprises:

at least one tubular linkage member having a first end portion and an opposed second end portion, the first end portion of the tubular linkage member pivotally connected to the inlet end portion of the conveyor, the opposed second end portion of the tubular linkage member having at least one aperture in opposite side portions thereof, the apertures being aligned and having a central axis;

at least one linkage member having a first end portion and an opposed second end portion, the linkage member telescopically disposed in the tubular linkage member such that the opposed second end portion of the linkage member extends a distance from the opposed second end portion of the tubular linkage member, the opposed second end portion of the linkage member pivotally connected to one of the first and second end portions of the chassis disposed adjacent the inlet end portion of the conveyor, the first end portion of the linkage member having at least one hole extending therethrough, the opposed second end portion of the linkage member having at least one hole extending therethrough, the hole in the first end portion of the linkage member alignable with the apertures in the opposed second end portion of the tubular linkage member when the conveyor is in the stored position and thus the tubular linkage member and the linkage member are in an extended position, the hole in the opposed second end portion of the linkage member alignable with the apertures in the opposed second end portion of the tubular linkage member when the conveyor is in one of the intermediate positions and the operative position end thus the tubular linkage member and the linkage member are in a retracted position; and securing means positionable within the aligned apertures in the opposed second end portion of the tubular linkage member and the hole in one of the first end portions and the second end portion of the linkage member for securing the tubular linkage member and the linkage member in one of the extended position and the retracted position.

11. The portable, self-erecting silo apparatus of claim 10 wherein the linkage assembly of the pivot means includes a pair of the tubular linkage members, a pair of the linkage members and a pair of the securing means, the tubular linkage members being maintained in a parallel, spatial relationship, the linkage members being maintained in a parallel, spatial relationship, and wherein the first end portion of the support member is connected to the first end portion of one of the tubular linkage members and the second end portion of the support member is connected to the first end portion of the other of the tubular linkage members.

12. The portable, self-erecting silo apparatus of claim 9 wherein the pivot means further comprises:

a support assembly for pivotally supporting the conveyor as the conveyor is moved between the stored position and the intermediate position, the pivot assembly stablizing the support frame with the first and opposed second end portions of the chassis.

13. The portable, self-erecting silo apparatus of claim 12 wherein the support assembly comprises:

at least one first brace member having a first end portion and a second end portion, the first end portion of the first brace member being mounted on one of the first end portion and the second end portion of the chassis, the second end portion of the first brace member being secured to the support frame, the end portion of the chassis on which the first end portion of the first brace member is mounted being characterized as the end portion of the chassis adjacent the inlet end portion of the conveyor;

at least one second brace member having a first end portion and a secnd end portion, the first end portion of the second brace member being mounted on the end portion of the chassis on which the first end portion of the first brace member is mounted, the first end portion of the second brace member being mounted a distance from the first end portion of the first brace member, the second end portion of the second brace member being secured to the first brace member at a position intermediate the first end portion and the second end portion of the first brace member;

a support member operably connected to the first brace member of the bracing means, the support member being transversely disposed with relation to the longitudinal axis of the conveyor at a position intermediate the first and second end portions of the first brace member; and, a bracket member connected to the medial portion of the conveyor, the bracket member operably engaging the support member such that the conveyor is pivotally supported via the support member and the bracket member when the conveyor is moved between the stored position and the intermediate position.

14. The portable, self-erecting silo apparatus of claim 3 which further comprises:

a forward linkage assembly having a first end portion and an opposed second end portion, the forward linkage assembly being movable between a first connecting position and a second connecting position, in the first connecting position the first end portion of the forward linkage assembly is connected to the opposed outlet end portion of the conveyor, the opposed second end portion of the forward linkage assembly is connected to one of the first and opposed second end portions of the chassis disposed below the outlet end portion of the conveyor when the conveyor is in the stored position such that the forward linkage assembly secures the conveyor in the stored position, and, in the second connecting position of the forward linkage assembly, the first end portion of the forward linkage assembly is connected to the opposed outlet end portion of the conveyor, the opposed second end portion of the forward linkage assembly is connected to the upper end portion of the container such that the conveyor is supported above the container when the container is in one of the intermediate position and the operative position.

15. The portable, self-erecting silo apparatus of claim 14 wherein the forward linkage assembly comprises:
at least one tubular linkage member having a first end portion and an opposed second end portion, the first end portion of the tubular linkage member pivotally connected to the opposed outlet end portion of the conveyor, the opposed second end portion of the tubular linkage member having at least one aperture in opposite side positions thereof, the apertures being aligned and having a central axis;
at least one linkage member having a first end portion and an opposed second end portion, the linkage member telescopically disposed in the tubular linkage member such that the opposed second end portion of the linkage member extends a distance from the opposed second end portion of the tubular linkage member, the opposed second end portion of the linkage member pivotally connected to one of the first and opposed second end portion of the chassis disposed substantially adjacent the outlet end of the conveyor when the conveyor is in the stored position, the opposed second end portion of the linkage member pivotally connected to the upper end portion of the container when the conveyor is in one of the intermediate and operative positions, the first end portion of the linkage member having at least one hole extending therethrough, the opposed second end portion of the linkage member having at least one hole extending therethrough, the hole in the first end portion of the linkage member alignable with the apertures in the opposed second end portion of the tubular linkage member when the conveyor is in the stored position and the opposed second end of the linkage member is pivotally connected to the chassis such that the tubular linkage member and the linkage member are in a retracted position, the hole in the opposed second end portion of the linkage member alignable with the apertures in the opposed second end portion of the tubular linkage member when the conveyor is in one of the intermediate positions and the operative portion and the opposed second end of the linkage member is pivotally connected to the upper end portion of the container such that the tubular linkage member and the linkage member are in an extended position; and,
securing means positionable within the aligned apertures in the opposed second end portion of the tubular linkage member and the hole in one of the first end portions and the second end portion of the linkage member and the linkage member for securing the tubular linkage member and the linkage member in one of the extended positions and the retracted position.

16. The portable, self-erecting silo apparatus of claim 15 wherein the forward linkage assembly includes a pair of the tubular linkage members, a pair of the linkage members, and a pair of the securing means, the tubular linkage members being maintained in a parallel, spatial relationship, the linkage members being maintained in a parallel, spatial relationship, and wherein the forward linkage assembly further comprises a support member having a first end portion and a second end portion, the first end portion of the support member being connected to the first end portion of one of the tubular linkage members and the second end portion of the support member being connected to the first end portion of the other of the tubular linkage members.

17. The portable, self-erecting silo apparatus of claim 1 wherein the support frame comprises:
a plurality of upright legs, each of the legs having an upper end portion and a lower end portion, two of the legs being connected to the first end portion of the chassis, two of the legs being connected to the opposed second end portion of the chassis, the lower end portion of each of the legs terminating a distance between the chassis and the supporting surface for the apparatus; and wherein
the laterally extending upper frame is operably connected to the upper end portion of the legs, the laterally extending frame having an opening therein adapted to receive the container when the container is in the first position.

18. The portable, self-erecting silo apparatus of claim 17 which further comprises a plurality of guide assemblies operably disposed between the container and the support frame, the guide assemblies maintaining the container in a predetermined relationship with the support frame as the container is moved between the first position and the raised second position.

19. The portable, self-erecting silo apparatus of claim 18 wherein each of the guide assemblies comprises:
a substantially vertically extending track assembly disposed between the upright leg of the support frame and the container; and
a roller assembly secured to at least one of the container and the support frame, the roller assembly operably engaging the track assembly for rolling engagement thereupon as the container moves between the first position and the raised second position.

20. The portable, self-erecting silo apparatus of claim 19 where the track assembly comprises:
a first leg member having an upper end portion of the first leg member being secured to the upper portion of the container and a lower end portion the lower end portion of the first leg member being secured to the converging lower end portion of the container such that the first leg member is disposed in a parallel, spatial relationship with the upright leg of the support frame.

21. The portable, self-erecting silo apparatus of claim 20 wherein the roller assembly comprises a first guide roller, the first guide roller secured to the upper end portion of the upright leg of the support frame such that the first guide roller is operably aligned for rolling engagement with the first leg member of the track assembly.

22. The portable, self-erecting silo apparatus of claim 21 wherein the track assembly further comprises a plurality of second leg members, each of the second leg members having an upper end portion and an opposed lower end portion, one of each of the second leg members of the track assembly being secured to the support frame such that one of the second leg members is substantially adjacent and parallel one of the upright legs of the support frame, the lower end portion of the second leg member terminating a distance from the supporting surface substantially equal to the distance between the lower end portion of the upright leg of the support frame and the supporting surface, the upper end portion of the second leg member terminating a distance from the first guide roller so as to prevent the second leg member from interfering with the operation of the first guide roller.

23. The portable, self-erecting silo apparatus of claim 22 wherein the roller assembly further comprises a second guide roller, the second guide roller secured to the converging lower end portion of the container such that the second guide roller is operably aligned for rolling engagement with the second leg member of the track assembly.

24. The portable, self-erecting silo apparatus of claim 23 wherein the container further comprises a lower support frame, the lower support frame being secured to the lower end portion of the first leg members of the track assembly.

25. The portable, self-erecting silo apparatus of claim 1 wherein the upper end portion of the container disposed adjacent the first end portion of the chassis is provided with a first recessed portion, the upper portion of the container disposed adjacent the opposed second end portion of the chassis is provided with a second recessed portion, the first and second recessed portions of the container being aligned; the laterally extending upper frame of the support frame being provided with a third recessed portion and a fourth recessed portion, the third recessed portion being alignable with the first recessed portion of the container when the container is in the first position within the support frame, the fourth recessed portion being alignable with the second recessed portion in the container when the container is in the first position within the support frame, the first and second recessed portions of the container and the third and fourth recessed portions of the laterally extending upper frame adapted to receive the medial portion of the conveyor when the container is in the first position within the support frame and the conveyor is in the stored position.

26. The portable, self-erecting silo apparatus of claim 25 wherein the lower end portion of the container is characterized as a converging lower end portion.

27. The portable, self-erecting silo apparatus of claim 1 which further comprises:
at least one brace member having a first end portion and a second end portion, the first end portion of the brace member being mounted on one of the first and second end portions of the chassis, the second end portion of the brace member being secured to the support frame, the end portion of the chassis on which the first end portion of the brace member is secured being characterized as the end portion of the chassis disposed below the outlet end portion of the conveyor when the conveyor is in the stored position.

28. The portable, self-erecting silo apparatus of claim 1 which further comprises:
ground engaging wheels operably mounted on one of the first and second end portions of the chassis; and
connecting means operably mounted on the other of the first and second end portions of the chassis for operably connecting the apparatus to a towing vehicle for movement of the apparatus from one location to another.

29. The portable, self-erecting silo apparatus of claim 28 which further comprises at least one landing gear mounted on the end portion of the chassis carrying the connecting means, the landing gear being movable between an operative ground engaging first position and an inoperative raised second position.

* * * * *

UNITED STATES PATENT AND TRADEMARK OFFICE
CERTIFICATE OF CORRECTION

PATENT NO. : 4,268,208
DATED : May 19, 1981
INVENTOR(S) : Ronald G. Hankins; Jimmie J. Butcher It is certified that error appears in the above—identified patent and that said Letters Patent is hereby corrected as shown below:

In column 2, line 13, the word "operably" should be --operable--.

In column 3, line 14, the word "reqrward" should be --rearward--.

In column 3, line 60, the numeral "56" should be --46--.

In column 6, line 8, the word "Teh" should be --The--.

In column 13, line 51, after the word "exterior", add the word --portion--.

Signed and Sealed this

Seventeenth Day of November 1981

[SEAL]

Attest:

GERALD J. MOSSINGHOFF

Attesting Officer

Commissioner of Patents and Trademarks